United States Patent
Akulis et al.

(10) Patent No.: US 10,235,546 B2
(45) Date of Patent: Mar. 19, 2019

(54) SYSTEMS AND METHODS FOR DETECTING AND DECODING BARCODES WITH BAR DILATION

(71) Applicant: LOCKHEED MARTIN CORPORATION, Bethesda, MD (US)

(72) Inventors: Joseph G. Akulis, Johnson City, NY (US); Robert Strebel, Endwell, NY (US); Richard C. Vanhall, Owego, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/521,890

(22) Filed: Oct. 23, 2014

(65) Prior Publication Data
US 2016/0117538 A1    Apr. 28, 2016

(51) Int. Cl.
*G06K 7/14*    (2006.01)
*G06K 7/10*    (2006.01)

(52) U.S. Cl.
CPC ............... *G06K 7/143* (2013.01); *G06K 7/14* (2013.01); *G06K 7/1456* (2013.01); *G06K 7/10861* (2013.01); *G06K 7/1417* (2013.01); *G06K 7/1443* (2013.01)

(58) Field of Classification Search
CPC ............... G06K 7/1443; G06K 7/1417; G06K 19/06037; G06K 7/10861; G06K 7/0166; G06K 7/1456
See application file for complete search history.

(56) References Cited

U.S. PATENT DOCUMENTS

| 5,073,954 A |   | 12/1991 | Van Tyne et al. |
| 5,477,042 A | * | 12/1995 | Wang .......................... 235/462.1 |
| 5,553,084 A | * | 9/1996 | Ackley ................... G06K 7/14 235/437 |
| 5,902,987 A | * | 5/1999 | Coffman .............. G06K 7/1452 235/462.1 |
| 6,176,428 B1 |   | 1/2001 | Joseph et al. |

(Continued)

FOREIGN PATENT DOCUMENTS

EP    0589361    3/1994

OTHER PUBLICATIONS

A. Zamberletti et al.—Robust Angle Invariant 1D Barcode Detection—ACPR13, Okinawa, Japan, Nov. 8, 2013, 15pp.

(Continued)

*Primary Examiner* — Christopher Stanford
(74) *Attorney, Agent, or Firm* — Kent Kemeny; Andrew M. Calderon; Roberts Mlotkowski Safran Cole & Calderon, P.C.

(57) ABSTRACT

Systems and methods for detecting and decoding 4-state barcodes with extreme bar dilation are disclosed. The method is implemented in a computing device and includes: separating an extracted image of a barcode into a top half and a bottom half; estimating bar positions and then sampling heights of the top and bottom images at each position; using adjacent bar height differences to determine the top and bottom of the tracker portion for each bar position; removing the tracker contribution to the top and bottom heights at each bar position; sending the resulting sequence of bars with ascender and descender information to a decoder for decoding processes.

20 Claims, 7 Drawing Sheets

(56) References Cited

U.S. PATENT DOCUMENTS

| | | | |
|---|---|---|---|
| 6,279,830 B1* | 8/2001 | Ishibashi | G06K 7/1417 235/454 |
| 6,293,466 B1 | 9/2001 | Fujita et al. | |
| 6,367,698 B1* | 4/2002 | Yamamoto et al. | 235/462.11 |
| 6,431,447 B1 | 8/2002 | Park et al. | |
| 6,708,884 B1 | 3/2004 | Su et al. | |
| 7,017,816 B2* | 3/2006 | Yen | G06K 7/10 235/462.08 |
| 7,305,131 B2* | 12/2007 | Yen | G06K 7/14 235/462.08 |
| 7,529,390 B2* | 5/2009 | Zhang | G06K 9/00221 382/118 |
| 8,138,438 B2 | 3/2012 | Stemmle | |
| 8,201,742 B2* | 6/2012 | Maeda et al. | 235/462.01 |
| 2007/0228171 A1* | 10/2007 | Thiyagarajah | G06K 7/14 235/462.09 |
| 2013/0256416 A1* | 10/2013 | Wang | G06K 7/1443 235/462.08 |

OTHER PUBLICATIONS

European Search Report in reference Application No. 15191210.2-1806 dated Mar. 10, 2016, 6pp.

\* cited by examiner

SYSTEMS AND METHODS FOR DETECTING AND DECODING BARCODES WITH BAR DILATION

FIELD OF THE INVENTION

The invention is directed to systems and methods for detecting and decoding barcodes. More particularly, the invention is directed to systems and methods for detecting and decoding 4-state barcodes with extreme bar dilation.

BACKGROUND DESCRIPTION

A barcode is an optical machine-readable representation of data, which identifies, for example, a product or object. The barcode has become a ubiquitous element in commercial and industrial use. For example, the barcode not only is used to identify items, e.g., product or objects, but it also helps to track items and provide other commercial uses, e.g., provide product information, discounts or special marketing offers.

Barcodes can be used to track numerous different items, ranging from rental cars to airline luggage. Barcodes can also be used to provide delivery information for sorting and sequencing of items into a delivery order sequence. For example, barcodes are used with first class mail, registered mail, express mail and parcels, as well as circulars and other types of mass mailings in order to sequence such items into a delivery order. By way of example, the United States Postal System (USPS) uses barcode symbology known as POSTNET (Postal Numeric Encoding Technique) to assist in sorting and sequencing the mail. POSTNET is being replaced by the Intelligent Mail barcode (also known as OneCode Solution).

Barcodes systematically represent data by varying the widths and spacings of parallel lines (bars). One type of barcode that is used mainly for postal applications is a 4-state barcode. This type of barcode has constant bar and space width. Data is encoded in the barcode by varying the height of the bars. There are four types of parallel lines (bars): tracker, ascender, descender and full. A tracker bar spans the middle third of the coding region; whereas, an ascender bar spans the top and middle third of the coding region and a descender bar spans the middle and bottom third of the coding region. A full bar spans the entire coding region. In the past most of these barcodes were designed with an extra bar at either end (called guard or framing bars) to help avoid misalignment during decoding. They might also have internal sequences of bars with fixed patterns (UPU S18d) for the same purpose. Newer barcode designs, however, often use more integrated methods for barcode alignment that do not require these alignment specific bars.

Barcodes can be scanned by optical scanners called barcode readers. These optical scanners can be a handheld device, e.g., portable digital assistants, stationary devices or other computing devices. In any scenario, the barcode reader is designed to read and subsequently decode the barcode using different decoding processes. Decoding can also be performed by a separate computing system, which receives the barcode information from the scanner.

In any event, detecting and decoding of barcodes is a complicated process, particularly when the barcode is dilated. For example, a barcode scanner may have difficulty detecting the barcode due to a lack of white space or separation between the different parallel lines, known as dilation, e.g., adjacent bars touch one another. Illustratively, one process of detecting of barcodes is Connected Region Analysis. This process can be used to initially locate bars and then link them together into sequences that are treated as potential barcodes. Another process is known to scan across the image and search for black/white repeated sequences that are indicative of scanning through the tracker section (middle) of a barcode. Both of these methods fail when the bars are dilated so much that they touch adjacent bars. Likewise, the various decoding methods require some level of horizontal separation between bars. The separation does not need to be perfect but there must be some level of separation for successful decodes.

SUMMARY OF THE INVENTION

In an aspect of the invention, a method implemented in a computing device comprises: separating an extracted image of a barcode into a top half and bottom half; locating a top and a bottom of a first defined image associated with the barcode by looking for differences in heights between the first defined image and other images associated with the barcode above and below the first defined image; removing contributions associated with the first defined image; and providing the other images above and below the removed contributions to a decoder for decoding processes.

In yet another aspect of the invention, a computer program product for detecting and decoding barcode information comprises a computer usable storage medium program code embodied in a storage medium. The program code is readable/executable by a computing device to: locate informational glyphs which are representative of a barcode; group together the informational glyphs as an object; determine that the object has a correct size to be a barcode; extract the object by tightly constraining the informational glyphs; rotate the extracted object horizontally and vertically to limit barcode information only; separate the extracted image associated with the barcode into a top half and bottom half; locate a top and a bottom of tracker images associated with the barcode by looking for differences in heights between the tracker images and adjacent ascender and descender images above and below the top and bottom of the tracker images; remove contributions associated with the tracker images; and provide a remaining portion of the extracted image associated with the barcode to a decoder for decoding processes.

In still yet another aspect of the invention, a system comprises: a CPU, a computer readable memory and a computer readable storage medium; program instructions to separate an extracted image of a barcode into a top half and bottom half; program instructions to locate a top and a bottom of tracker images associated with the barcode by looking for differences in heights between the tracker images and other images associated with the barcode above and below the tracker images; program instructions to remove contributions associated with the tracker images between the other images above and below the tracker images; and program instructions to provide the other images above and below the tracker images to a decoder for decoding processes. The program instructions are stored on the computer readable storage.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to systems and methods for detecting and decoding barcodes. More particularly, the invention is directed to systems and methods for detecting and decoding 4-state barcodes with extreme bar dilation. Although the present invention will be described in relation to a 4-state barcode, one of skill in the art should understand that the present invention can also be successfully implemented in other environments, including different barcode types, etc. In any scenario, advantageously, by implementing the systems and processes of the present invention it is now possible to detect and decode barcodes with extreme bar dilation.

Figure 1A:
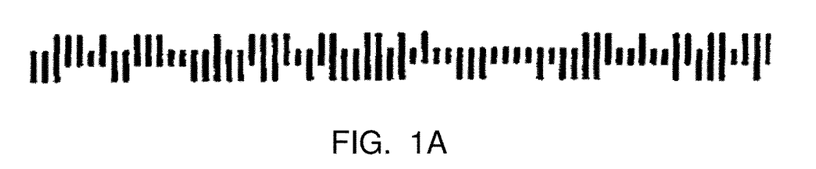
FIG. 1A shows a barcode comprising a 4-state barcode with individual bars separated.
Figure 1B:
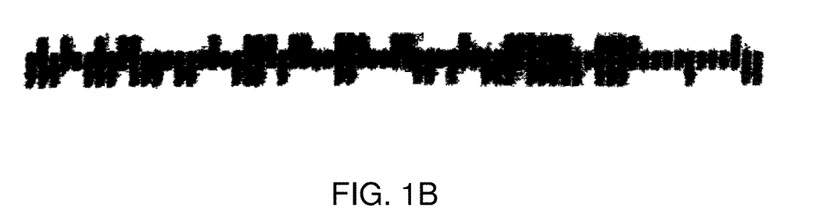
FIG. 1B shows a barcode comprising a 4-state barcode with dilation of individual bars.

In specific embodiments, the invention is directed to systems and methods for decoding 4-state barcodes with no horizontal tracker separation (as shown in FIG. 1B, as an example). That is, in embodiments, the systems and methods can detect as a barcode a sequence of touching or near touching bars and extract information for subsequent decoding.

In more specific embodiments, the decoding of the 4-state barcodes can be provided by treating the 4-state barcode as a sampled two dimensional pixel array rather than a sequence of bars. The resulting "bars" can then be decoded by existing logical domain decoders using conventional decoding processes. For example, the barcode detection identifies various informational glyphs, which are grouped together as a bar code object. A glyph can be a specific shape, design, or representation of a character, for example. Once the object is located and grouped together, its location can be more tightly constrained in order to, e.g., (i) determine that the object has the correct size to be a potential barcode, and (ii) extract a sub-image of the barcode that is rotationally corrected and horizontally and vertically limited to the barcode only. As to the latter feature (ii), the systems and processes of the present invention will eliminate any potential extraneous information which can affect the decoding processes, and then sample data from the object to extract barcode information; compared to processing the actual location of the ascender and descender information (since they are not individually discernible). In this way, the systems and methods of the present invention do not require any specialized bar based detection, thus minimizing costs and equipment.

FIG. 1A shows a bi-level image of a 4-state barcode with individual bars separated by whitespace or at least some whitespace between the individual bars. In comparison, FIG. 1B shows a 4-state barcode with dilation of individual bars. More specifically, FIG. 1B shows an image of a barcode in which the horizontal separation between bars has been almost entirely lost due to poor binarization. As should be realized by those of skill in the art, this barcode most likely cannot be detected and even if it was detected, decoding would most likely fail because of the touching bars. Advantageously, though, the systems and methods of the present invention will be able to detect and decode such exemplary barcodes as shown in FIG. 1B, as described herein.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible (non-transitory) storage having computer-usable program code embodied in the medium (non-transitory medium). The computer-usable or computer-readable medium may be medium that can contain or store information for use by or in connection with the instruction execution system, apparatus, or device. The computer-usable or computer-readable medium may be, for example, an electronic, magnetic, optical, electromagnetic, infrared, or semiconductor system, apparatus, or device. More specific examples of the computer readable storage medium, memory or device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, memory or device, or computer-usable or computer-readable medium, as used herein, is not to be construed as being transitory signals per se.

Figure 2:
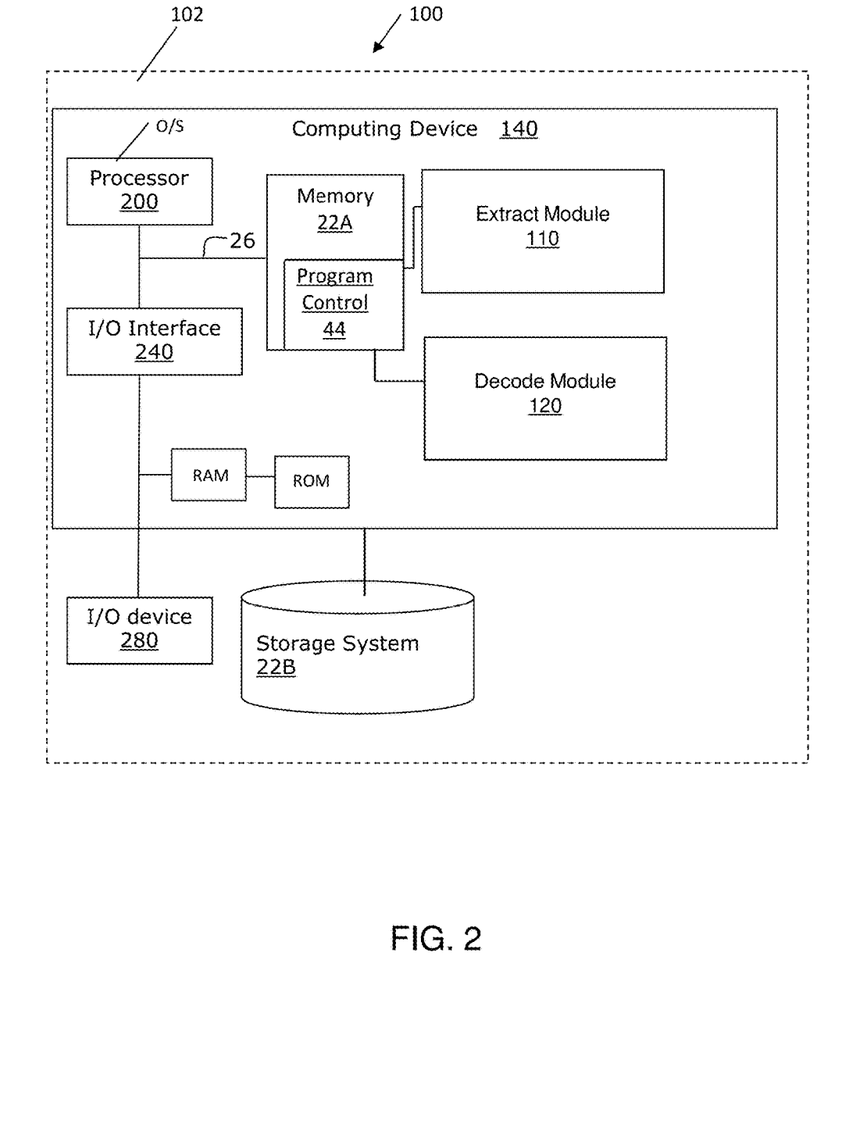
FIG. 2 shows an illustrative environment for implementing the steps in accordance with aspects of the present invention.

FIG. 2 shows an illustrative environment 100 for managing the processes in accordance with the invention. The environment 100 includes a server or other computing system 102 that can perform the processes described herein. In embodiments, the illustrative environment may be used in a mail sorting and sequencing system, as shown illustratively in FIG. 8; although other sorting and sequencing systems are also contemplated by the present invention. The computing system 102 includes a computing device 14 which can be resident on or communicate with a network infrastructure or other computing devices.

The computing device 140 includes a processor 200, memory 22A, an I/O interface 240, and a bus 260. In addition, the computing device includes random access memory (RAM), a read-only memory (ROM), and an operating system (O/S). The computing device 140 is in communication with an external I/O device/resource 280 and the storage system 22B. The I/O device 280 can comprise any device that enables an individual to interact with the computing device 140 (e.g., user interface) or any device that enables the computing device 140 to communicate with one or more other computing devices using any type of communications link or any device that enables the computing device 140 to interact with is environment. By way of example, the I/O device 280 can be a barcode scanning device or other optical reading device for reading/detecting barcodes.

The processor 200 executes computer program code (e.g., program control 44), which can be stored in the memory 22A and/or storage system 22B. While executing the computer program code, the processor 200 can read and/or write data to/from memory 22A, storage system 22B, and/or I/O interface 240. The program code 44 executes the processes of the invention such as, for example, detect and decode barcodes with extreme bar dilation.

More specifically, the computing device 140 includes an Extract Module 110 and a Decode Module 120, which can be implemented as one or more program code in the program control 44 stored in memory 22A as a separate or combined module. Additionally, each of the Extract Module 110 and Decode Module 120 may be implemented as separate dedicated processors or a single or several processors to provide the functionality of this tool. Moreover, it should be understood by those of ordinary skill in the art that the Extract Module 110 and Decode Module 120 are used as a general descriptive term for providing the features and/or functions of the present invention, and that the Extract Module 110 and Decode Module 120 may comprise many different components such as, for example, the components and/or infrastructure described and shown with reference to FIG. 2.

Figure 3:
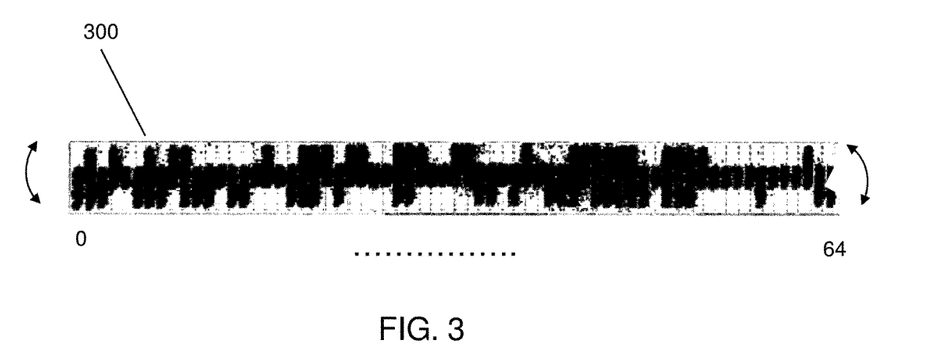
FIG. 3 shows extracted barcode image information in accordance with aspects of the present invention.

In embodiments, the Extract Module 110 locates various informational glyphs which can be representative of a barcode. For example, the Extract Module 110 will initially detect and/or locate known characteristics of a barcode, e.g., connected regions, length and height of characters, a sequence of characters, etc., which can be grouped together as an object. Once the object is defined, the Extract Module 110 can determine whether the object has a correct size to be a barcode. If the object has the correct size to be a barcode, the image associated with the barcode can be extracted for decoding, e.g., more tightly constrained in a box as shown in FIG. 3. In the extracting process, the object (e.g., barcode 300 with 65 bars labeled 0-64) can be rotationally corrected and horizontally and vertically limited to the barcode only, as shown representatively in FIG. 3 by the arrows.

Once the object information is extracted, the Extract Module 110 can then perform additional processes in accordance with aspects of the present invention, e.g., treat the 4-state barcodes as a two-dimensional barcode for decoding purposes. More specifically, the Extract Module 110 can lay a grid about the extracted object for sampling purposes as described herein, e.g., separate the image associated with the barcode into a top and bottom half, assuming that the image associated with the barcode is rotated close enough to zero degrees such that the midpoint will pass entirely through the tracker. The grid can also include columns, closely aligned with each of the bars. The Extract Module 110 can sample the estimated bar position and separately determine a delta height for the ascender and descender. A line is fit to the tracker top and the tracker bottom, with the Extract Module 110 then removing tracker contribution as well as any non-zero rotation height distortions. The barcode can then be decoded by an existing decoder, e.g., Decode Module 120, as a as a one dimensional array of bars with ascender and descender information.

Processes of the Present Invention

Figure 4:
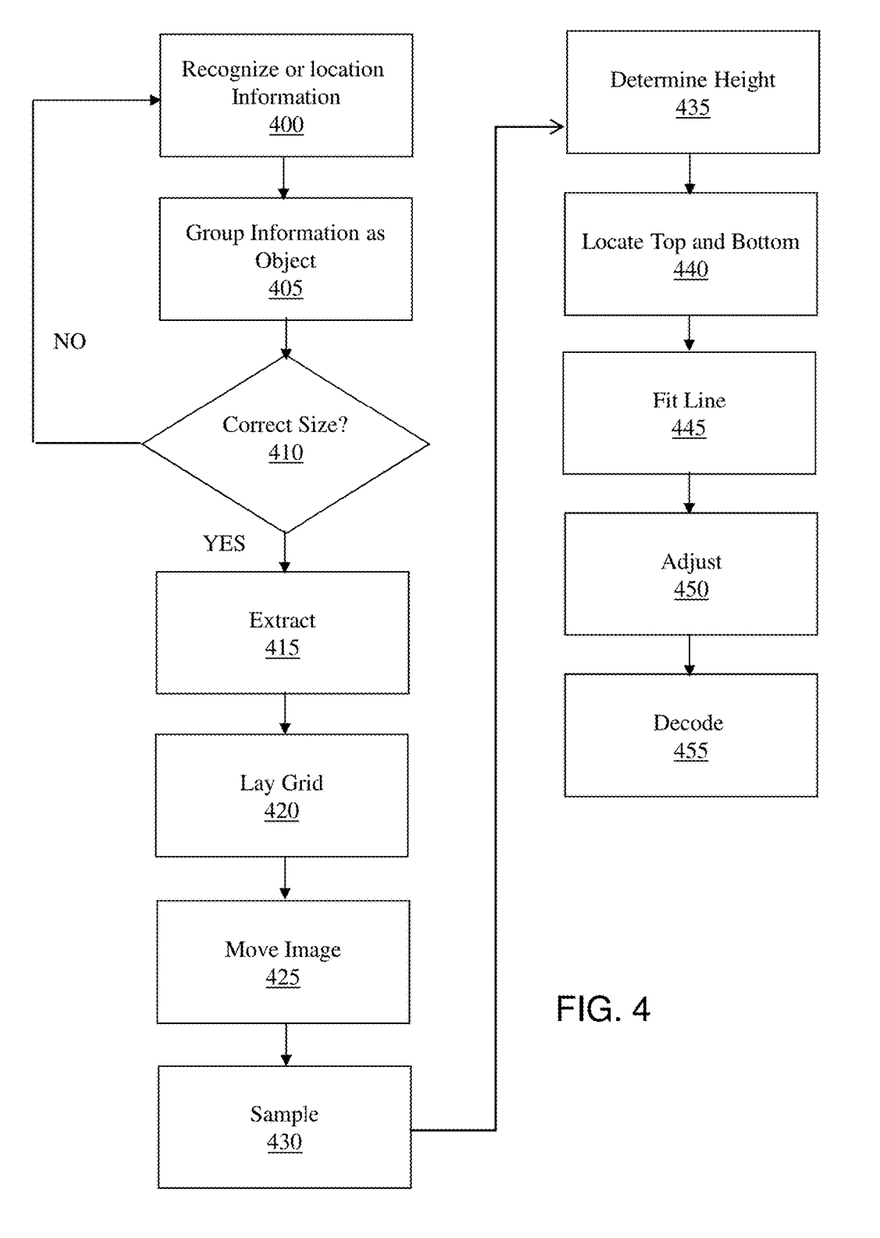
FIG. 4 shows a process flow for implementing steps of the present invention.

FIG. 4 shows a process flow for implementing steps of the present invention. The steps shown in FIG. 4 can be controlled by the computer system environment 100 of FIG. 2. The exemplary flow can be illustrative of a system, a method, and/or a computer program product and related functionality implemented on the computing system of FIG. 2, in accordance with aspects of the present invention. It is noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

As described herein, the computer program product may include computer readable program instructions stored on computer readable storage medium (or media). The computer readable storage medium include the one or more storage medium as described with regard to FIG. 2, e.g., non-transitory media, a tangible device, etc. The method, and/or computer program product implementing the flow of FIG. 4 can be downloaded to respective computing/processing devices, e.g., computing system of FIG. 2 as already described herein, or implemented on a cloud infrastructure. Accordingly, the processes associated with each flow of the present invention can be implemented by special purpose hardware-based systems that perform the specified functions or acts or carry out combinations of special purpose hardware and computer instructions.

Referring to FIG. 4, at step 400, the processes of the present invention recognize or locate various informational glyphs which can be representative of a barcode as already described herein, e.g., the processes of the present invention will initially detect known characteristics of a barcode. At step 405, this information will be grouped together as an object. Once the object is defined, at step 410, the processes will determine that the object has a correct size to be a potential bar code. If the object is not the correct size, the processes will revert back to step 405. If the processes determine that the object has the correct size to be a barcode, at step 415, the image (object) associated with the barcode can be extracted for decoding, e.g., more tightly constrained in a box as shown in FIG. 3. In the extracting process, the object can be rotationally corrected and horizontally and vertically limited to the barcode only as shown in FIG. 3. In embodiments, the processes of the present invention will rotate the object to, e.g., 0 degrees.

Figure 5:
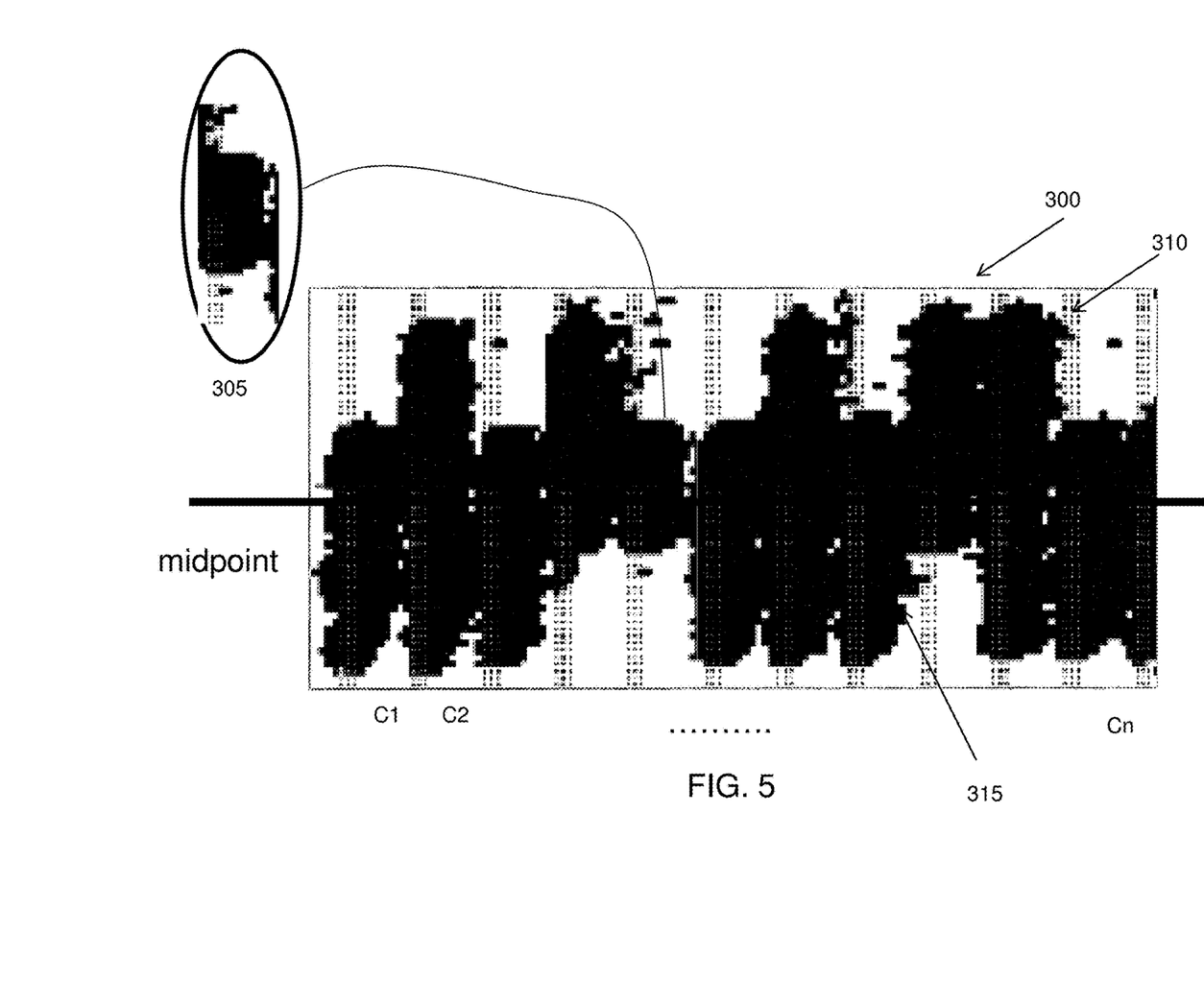
FIG. 5 shows extracted object information with a grid layout in accordance with aspects of the present invention.

Once the object information is extracted, at step 420, the processes of the present invention can lay a grid about the extracted object (extracted barcode information) 300 as shown in FIG. 5 for sampling purposes. By way example, the grid includes separating the image (object) 300 into a top half and a bottom half as well as columns (C1, C2, . . . Cn) as shown in FIG. 5. It should be understood by those of skill in the art that FIG. 5 shows an enlarged portion of FIG. 3.

In embodiments, the processes of step 420 assume that the image associated with the barcode is rotated close enough to zero degrees for the midpoint line to pass entirely (or close as possible to entirely) through the tracker, e.g., as represented at reference numeral 305. At this point, though, the tracker's vertical extent (compared to the entire image) is unknown. On the other hand, the columns C1, C2, . . . Cn are dimensioned such that the extracted sub-images, e.g., tracker image 305, ascender image 310 and descender image 315 associated with the barcode, are preferably provided in separate columns (or as close as possible in separate columns), with the least amount of extraneous information.

In embodiments, at step 425, the processes of the present invention can move the sampling points left and/or right in an attempt to obtain more stable sampling data, e.g., obtain less variation in the sampled data. That is, the processes of the present invention can try to center the image (e.g., tracker 305) locally within a column or, alternatively, can attempt to center the entire image 300 (associated with the barcode) globally, in order to remove extraneous information and particularly any pixels associated with an adjacent bar. In embodiments, such adjustment can be performed using a pixel by pixel movement until the most stable data for sampling is obtained. By way of example, the processes of the present invention can move the tracker image 305 until it is completely centered within a single column. In this way, for example, extraneous pixels in the vertical extent can be excluded from a sampling of the tracker image.

At step 430, the estimate bar positions are now sampled in accordance with aspects of the present invention. The sampling can be performed using, for example, mathematical, global best fit or local best fit methods. In embodiments, the sampling will obtain information on "tall" bars and "short" bars. More specifically, the sampling will include information obtained from the top half of the grid of FIG. 5 which represents ascender bar information and information obtained from the bottom half of the grid which represents descender bar information. In embodiments, the sampling can include a plurality of pixels in a width direction, comprising a column of pixels, with a preference for about three pixels wide. In any sampling, the present invention obtains information of such a quantity in order to provide a statistical analysis.

At step 435, the height of the ascender and descender are determined separately using, for example, a histogram of adjacent bar to bar height differences. For example, Table 1 numerically shows the number of pixels below and above the midpoint (as shown in FIG. 5) for each bar, e.g., bars 0-64, shown in FIG. 5 (or FIG. 3). For example, Table 1 represents each bar shown in FIG. 5 (or FIG. 3) and a number of sampled pixels for each bar, above and below the midpoint. It should be understood by those of ordinary skill in the art that the data of Table 1 is provided as a single, non-limiting example and that other data sets are also contemplated by the present invention.

In Table 1, the "below" column is representative of the number of pixels counted below the midpoint shown in FIG. 5; whereas, the "above" column is representative of the number of pixels counted above the midpoint shown in FIG. 5. In embodiments, as described already herein, the pixels counted above and below the midpoint can be a set of three (3) pixels wide in order to obtain a statistically stable pixel count for a sampling set; although a different number of pixels are also contemplated by the present invention for the sampling.

TABLE 1

| Bar | Number of Pixels Below a Midpoint | Number of Pixels Above a Midpoint |
| --- | --- | --- |
| 0 | 26 | 8 |
| 1 | 26 | 23 |
| 2 | 25 | 8 |
| 3 | 14 | 24 |
| 4 | 9 | 14 |
| 5 | 25 | 8 |
| 6 | 25 | 23 |

TABLE 1-continued

| Bar | Number of Pixels Below a Midpoint | Number of Pixels Above a Midpoint |
| --- | --- | --- |
| 7 | 25 | 14 |
| 8 | 10 | 25 |
| 9 | 24 | 24 |
| 10 | 24 | 10 |
| 11 | 25 | 10 |
| 12 | 9 | 10 |
| 13 | 24 | 10 |
| 14 | 24 | 10 |
| 15 | 9 | 12 |
| 16 | 8 | 26 |
| 17 | 8 | 10 |
| 18 | 23 | 10 |
| 19 | 24 | 26 |
| 20 | 24 | 26 |
| 21 | 7 | 26 |
| 22 | 23 | 11 |
| 23 | 8 | 26 |
| 24 | 7 | 27 |
| 25 | 9 | 12 |
| 26 | 7 | 11 |
| 27 | 23 | 27 |
| 28 | 23 | 27 |
| 29 | 7 | 27 |
| 30 | 8 | 11 |
| 31 | 7 | 11 |
| 32 | 9 | 27 |
| 33 | 11 | 27 |
| 34 | 22 | 20 |
| 35 | 22 | 12 |
| 36 | 7 | 11 |
| 37 | 22 | 11 |
| 38 | 11 | 27 |
| 39 | 11 | 20 |
| 40 | 24 | 14 |
| 41 | 24 | 12 |
| 42 | 23 | 26 |
| 43 | 15 | 27 |
| 44 | 24 | 27 |
| 45 | 23 | 26 |
| 46 | 25 | 26 |
| 47 | 24 | 26 |
| 48 | 24 | 15 |
| 49 | 8 | 10 |
| 50 | 24 | 25 |
| 51 | 24 | 26 |
| 52 | 23 | 25 |
| 53 | 8 | 25 |
| 54 | 8 | 11 |
| 55 | 9 | 10 |
| 56 | 8 | 10 |
| 57 | 8 | 11 |
| 58 | 23 | 10 |
| 59 | 7 | 10 |
| 60 | 7 | 11 |
| 61 | 7 | 10 |
| 62 | 7 | 26 |
| 63 | 21 | 11 |
| 64 | 21 | 9 |

At step 440, tops of trackers and bottoms of trackers associated with the barcode are located by looking for ascender sized and descender sized deltas in height. For example, numeric data shown in Table 1, e.g., a number of pixels below and above a midpoint, is mapped to a histogram shown in Table 2. It should be understood by those of ordinary skill in the art that the data of Table 2 is provided as a single, non-limiting example and that other data sets are also contemplated by the present invention based on different data provided in Table 1.

TABLE 2

| Delta Bin | Number of bars having pixels below a midpoint | Number of bars having pixels above a midpoint |
|---|---|---|
| 0 | 19 | 18 |
| 1 | 13 | 13 |
| 2 | 5 | 3 |
| 3 | 0 | 0 |
| 4 | 0 | 0 |
| 5 | 1 | 1 |
| 6 | 0 | 2 |
| 7 | 0 | 2 |
| 8 | 1 | 1 |
| 9 | 1 | 1 |
| 10 | 0 | 1 |
| 11 | 3 | 2 |
| 12 | 0 | 0 |
| 13 | 1 | 0 |
| 14 | 2 | 4 |
| 15 | 9 | 8 |
| 16 | 8 | 8 |
| 17 | 1 | 0 |
| 18 | 0 | 0 |
| 19 | 0 | 0 |
| 20 | 0 | 0 |
| 21 | 0 | 0 |
| 22 | 0 | 0 |
| 23 | 0 | 0 |
| 24 | 0 | 0 |
| 25 | 0 | 0 |
| 26 | 0 | 0 |
| 27 | 0 | 0 |
| 28 | 0 | 0 |
| 29 | 0 | 0 |

In the histogram shown in Table 2, a difference between a number of pixels for adjacent bars for each of the columns labeled "below" and "above" are calculated and mapped to the histogram. In the histogram shown in Table 2, for example, (i) the column labeled "delta bin" is representative of a difference of the number of pixels between adjacent bars, (ii) the column labeled "below" shows the number of times each pixel count of the adjacent bars will have the difference shown in the "delta bin" column, and (iii) the column labeled "above" shows the number of times each pixel count of the adjacent bars will have the difference shown in the "delta bin" column.

As an illustrative, non-limiting example, Table 2 shows:

(i) eight (8) instances of adjacent bars with a difference of 15 pixels for the "above" column and nine (9) instances of adjacent bars with a difference of 15 pixels for the "below" column;

(ii) four (4) instances of adjacent bars with a difference of 14 pixels for the "above" column and there are two (2) instances of adjacent bars with a difference of 14 pixels for the "below" column; and (iii) eight (8) instances of adjacent bars with a difference of 16 pixels for the "above" column and there eight (8) instances of adjacent bars with a difference of 14 pixels for the "below" column.

By using the histogram, it is now possible to determine the number of maximum peaks centered within a range of values, e.g., delta bin. In this example, the maximum number of peaks for the descender (represented in the "below" column) and ascender (represented in the "above" column) are centered on delta bins 14-16 and more specifically centered on delta bin 15. It should be understood by those of skill in the art that delta bin "0" represents two adjacent bars of the same height; whereas, delta bin "1" can be considered as two adjacent bars having the same height, as one pixel difference in height may be considered insignificant or extraneous information.

Figure 6:
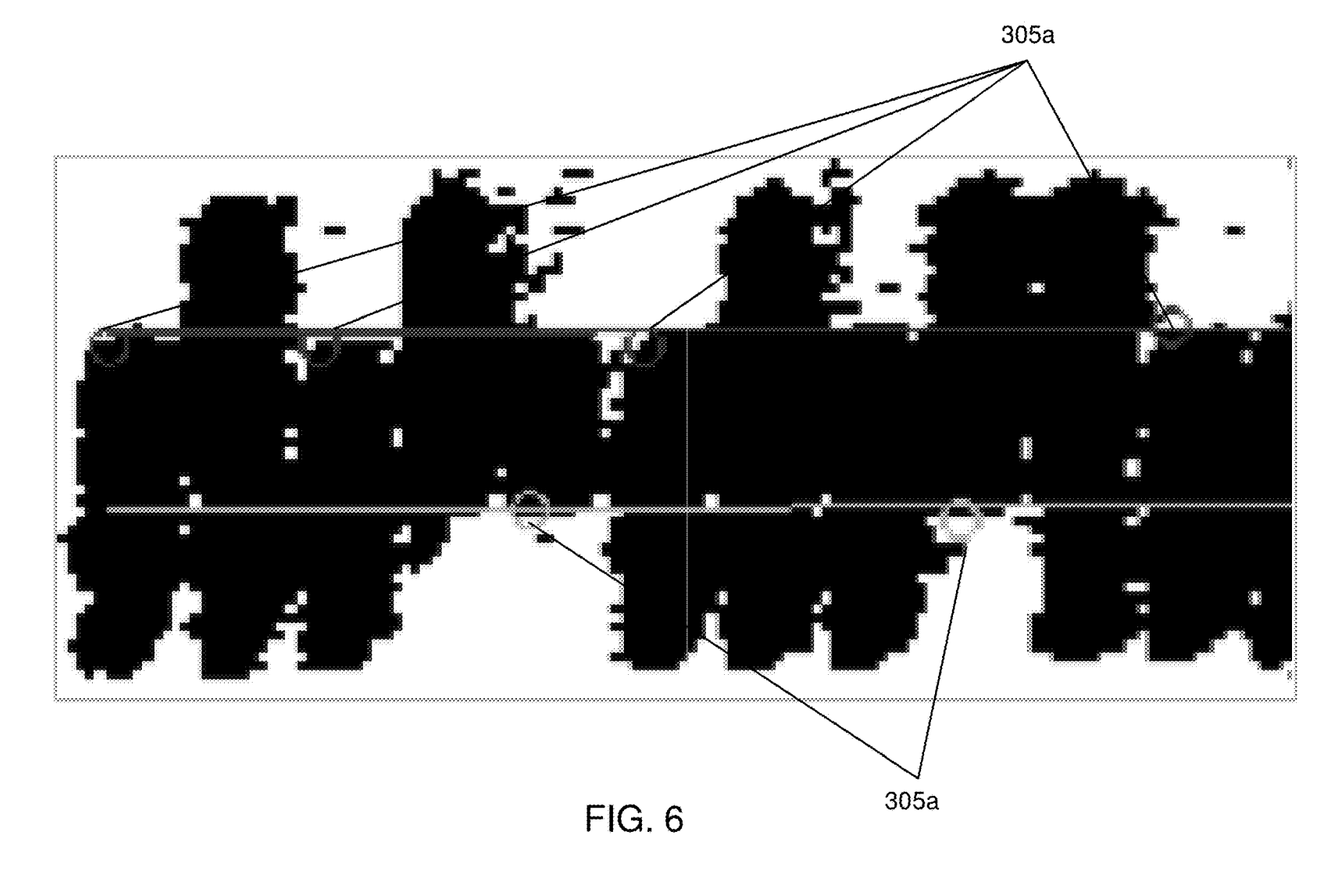
FIG. 6 shows extracted object information with a line fit to the top and bottom of tracker image in accordance with aspects of the present invention.

Once the information of Table 2 is calculated/mapped, at step 445, the processes of the present invention can fit a line to the top and bottom of the tracker as shown in FIG. 6, for example, by using data points of Table 3. It should be understood by those of ordinary skill in the art that the data of Table 3 is provided as a single, non-limiting example and that other data sets are also contemplated by the present invention based on different data provided in Table 1.

More specifically, Table 3 shows a flag placed for each adjacent bar designated in Table 2 as falling within a difference of 14-16 pixels, e.g., tops and bottoms of tracker information. More specifically, for the "top" of the tracker line, if the difference between two adjacent bars in indicative of an ascender to tracker transition, the second bar (tracker) is flagged. If the difference is indicative of a tracker to ascender transition, the first bar (tracker) is flagged. This same concept is repeated for the "bottom" of the tracker.

This data can then be mapped to FIG. 6 as shown by the circles 305a at a top and a bottom of designated tracker information 305. It should be understood by those of skill in the art that the barcode representation of FIG. 6 is only a partial representation of the barcode shown in FIG. 3.

TABLE 3

| Bar | Number of Pixels Below a Midpoint | Number of Pixels Above a Midpoint | Bottom Flag | Top Flag |
|---|---|---|---|---|
| 0 | 26 | 8 | 0 | 1 |
| 1 | 26 | 23 | 0 | 0 |
| 2 | 25 | 8 | 0 | 1 |
| 3 | 14 | 24 | 0 | 0 |
| 4 | 9 | 14 | 1 | 0 |
| 5 | 25 | 8 | 0 | 1 |
| 6 | 25 | 23 | 0 | 0 |
| 7 | 25 | 14 | 0 | 0 |
| 8 | 10 | 25 | 1 | 0 |
| 9 | 24 | 24 | 0 | 0 |
| 10 | 24 | 10 | 0 | 1 |
| 11 | 25 | 10 | 0 | 0 |
| 12 | 9 | 10 | 1 | 0 |
| 13 | 24 | 10 | 0 | 0 |
| 14 | 24 | 10 | 0 | 0 |
| 15 | 9 | 12 | 1 | 1 |
| 16 | 8 | 26 | 0 | 0 |
| 17 | 8 | 10 | 1 | 1 |
| 18 | 23 | 10 | 0 | 1 |
| 19 | 24 | 26 | 0 | 0 |
| 20 | 24 | 26 | 0 | 0 |
| 21 | 7 | 26 | 1 | 0 |
| 22 | 23 | 11 | 0 | 1 |
| 23 | 8 | 26 | 1 | 0 |
| 24 | 7 | 27 | 0 | 0 |
| 25 | 9 | 12 | 0 | 1 |
| 26 | 7 | 11 | 1 | 1 |
| 27 | 23 | 27 | 0 | 0 |
| 28 | 23 | 27 | 0 | 0 |
| 29 | 7 | 27 | 1 | 0 |
| 30 | 8 | 11 | 0 | 1 |
| 31 | 7 | 11 | 0 | 1 |
| 32 | 9 | 27 | 0 | 0 |
| 33 | 11 | 27 | 0 | 0 |
| 34 | 22 | 20 | 0 | 0 |
| 35 | 22 | 12 | 0 | 0 |
| 36 | 7 | 11 | 1 | 0 |
| 37 | 22 | 11 | 0 | 1 |
| 38 | 11 | 27 | 0 | 0 |
| 39 | 11 | 20 | 1 | 0 |
| 40 | 24 | 14 | 0 | 0 |
| 41 | 24 | 12 | 0 | 1 |
| 42 | 23 | 26 | 0 | 0 |
| 43 | 15 | 27 | 0 | 0 |
| 44 | 24 | 27 | 0 | 0 |
| 45 | 23 | 26 | 0 | 0 |
| 46 | 25 | 26 | 0 | 0 |
| 47 | 24 | 26 | 0 | 0 |

TABLE 3-continued

| Bar | Number of Pixels Below a Midpoint | Number of Pixels Above a Midpoint | Bottom Flag | Top Flag |
|---|---|---|---|---|
| 48 | 24 | 15 | 0 | 0 |
| 49 | 8 | 10 | 1 | 1 |
| 50 | 24 | 25 | 0 | 0 |
| 51 | 24 | 26 | 0 | 0 |
| 52 | 23 | 25 | 0 | 0 |
| 53 | 8 | 25 | 1 | 0 |
| 54 | 8 | 11 | 0 | 1 |
| 55 | 9 | 10 | 0 | 0 |
| 56 | 8 | 10 | 0 | 0 |
| 57 | 8 | 11 | 1 | 0 |
| 58 | 23 | 10 | 0 | 0 |
| 59 | 7 | 10 | 1 | 0 |
| 60 | 7 | 11 | 0 | 0 |
| 61 | 7 | 10 | 0 | 1 |
| 62 | 7 | 26 | 1 | 0 |
| 63 | 21 | 11 | 0 | 1 |
| 64 | 21 | 9 | 0 | 0 |

Figure 7:
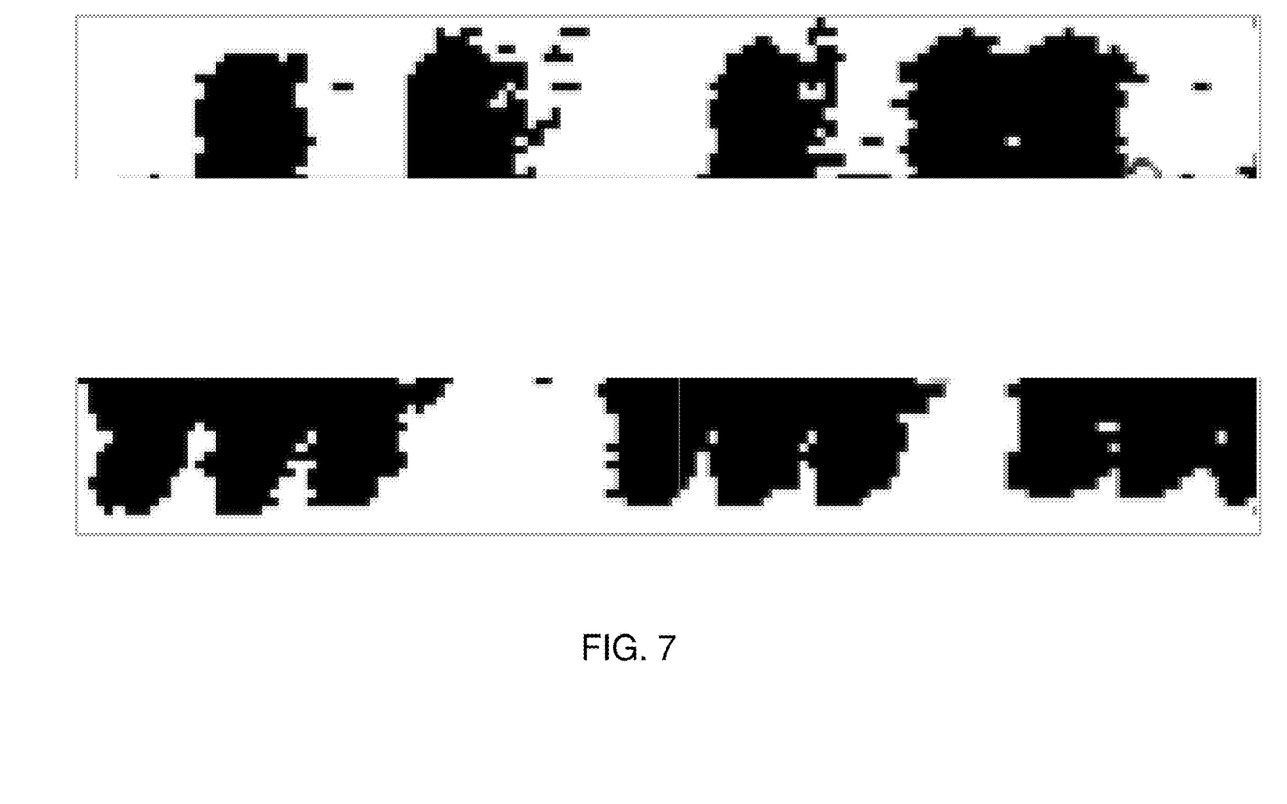
FIG. 7 shows the extracted information of FIG. 6, with the tracker image and extraneous image information removed, in accordance with aspects of the present invention.

In embodiments, at step 450, the ascender and descender heights can be adjusted to remove tracker contribution. This adjustment can also remove any non-zero height distortions. So, for example, as shown in FIG. 7, all information between the lines of FIG. 6 can be removed. In addition, any extraneous information due to non-zero height distortions, typically occurring due to the rotation process not being able to rotate the image zero degrees can also be removed. This will leave only ascender and descender information, which can then be decoded by an existing decoder at step 455.

Exemplary Sorting System

Figure 8:
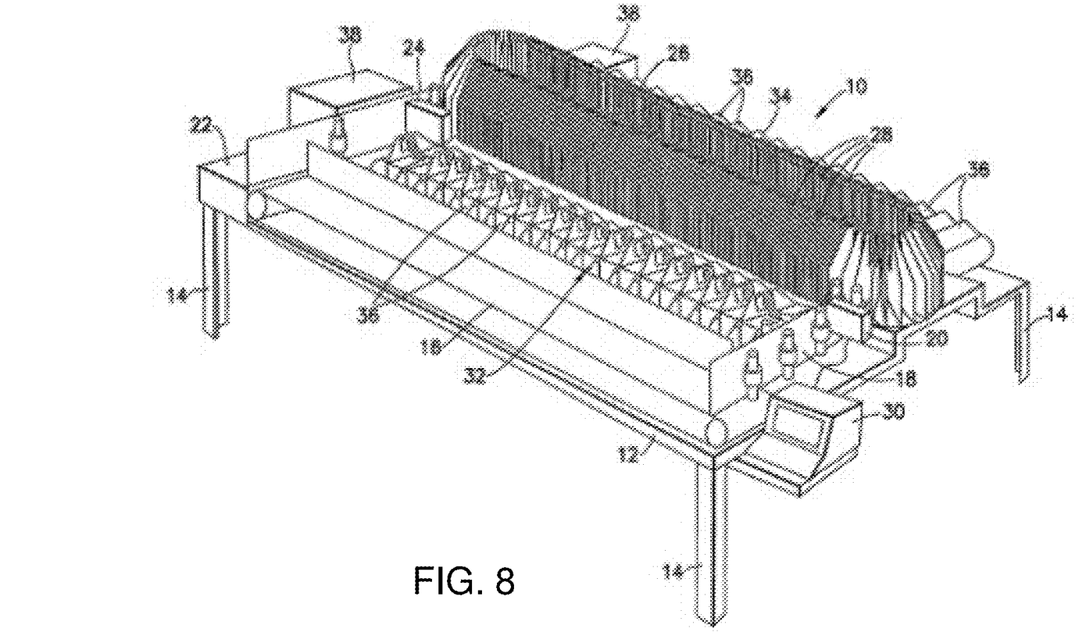
FIG. 8 shows an illustrative mail sorting and sequencing system, which can be used in implementing the processes of the present invention.

FIG. 8 shows an illustrative mail sorting and sequencing system, which can be used with the processes of the present invention. It should be understood by those of skill in the art that the present invention can be implemented with any number of mail sorting and sequencing systems, and that the illustrative representation of the mail sorting and sequencing system of FIG. 8 should not be considered a limiting feature to the claimed invention.

As shown in FIG. 8, the mail sorting and sequencing system is a single pass carrier delivery sequence sorter generally indicated by the numeral 10. The single pass carrier delivery sequence sorter 10 has a base 12 with four legs 14 (only three shown in FIG. 3) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner explained. In embodiments, the address readers 20, 24 and/or video encoder/numerical controller 30 or other computing devices can read barcode information and implement the processes of the present invention, e.g., provide the functions of the Extract Module 110 and the Decode Module 120. On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12. See, e.g., U.S. Pat. No. 8,138,438, for a full detailed explanation of the single pass carrier delivery sequence sorter 10 and related systems, the contents of which are incorporated by reference in their entirety herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method implemented in a computing device, comprising:
    separating, by a computer processor, an extracted image associated with a dilated barcode which includes adjacent bars that touch or nearly touch, into a top half and bottom half;
    centering, by the computer processor, a first defined image of the extracted image associated with the dilated barcode using a pixel by pixel movement of the first defined image so that the first defined image is completely centered within a single column so that extraneous pixels in a vertical extent are excluded from a sampling of the first defined image;
    locating, by the computer processor, a top and a bottom of the first defined image for the sampling of the first defined image by looking for differences in heights between the first defined image and other images associated with the dilated barcode above and below the first defined image;
    removing, by the computer processor, contributions associated with the first defined image by removing the first defined image which isolates the other images from the contributions; and
    providing, by the computer processor, the other images associated with the dilated barcode above and below the removed contributions to a decoder for decoding processes to decode the dilated barcode.

2. The method of claim 1, wherein the first defined image is associated with tracker images and the other images are associated with ascender images and descender images.

3. The method of claim 2, wherein the removing of the contributions associated with the first defined image comprises fitting a line to a top of the tracker images and a line to a bottom of the tracker images and removing any pixels within the lines.

4. The method of claim 3, further comprising rotating the extracted image such that the separating comprises providing a midpoint line passing entirely or close to entirely through the tracker images.

5. The method of claim 4, wherein the top of the tracker images and the bottom of the tracker images are located by looking for ascender sized and descender sized deltas in height.

6. The method of claim 5, further comprising separately determining a height of the ascender images and a height of the descender images.

7. The method of claim 6, further comprising locally or globally moving sampled points of the extracted image left and/or right to obtain stable sampling data.

8. The method of claim 6, wherein the height of the ascender images and the height of the descender images are determined by adjacent bar to bar height differences.

9. The method of claim 8, wherein the height of the ascender images and the height of the descender images are adjusted to remove tracker contribution.

10. The method of claim 9, further comprising removing any non-zero rotation height distortions of the ascender images and the descender images.

11. The method of claim 10, further comprising decoding, by a logical domain decoder, the other images associated with the dilated barcode as a one dimensional array of information.

12. The method of claim 11, wherein the looking for differences in heights between the first defined image and the other images above and below the first defined image comprises laying a grid separating the first defined image at a midpoint between the top and the bottom of the first defined image and a plurality of columns dimensioned to separate the first defined image and the other images.

13. A computer program product for detecting and decoding barcode information, comprising a computer usable storage medium program code embodied in a storage medium, wherein the program code is readable/executable by a computing device to:
locate informational glyphs which are representative of a dilated barcode having adjacent parallel bars that touch;
group together the informational glyphs as an object;
determine that the object has a correct size to be a barcode;
extract the object by tightly constraining the informational glyphs;
rotate the extracted object which is horizontally and vertically limited to barcode information only;
separate the extracted image associated with the dilated barcode into a top half and bottom half;
locate a top and a bottom of the tracker images associated with the dilated barcode by looking for differences in heights between the tracker images and adjacent ascender and descender images associated with the dilated barcode above and below the top and bottom of the tracker images;
remove contributions associated with the tracker images to form a remaining portion barcode;
provide the remaining portion barcode of the extracted image associated with the dilated barcode to a decoder for decoding processes to decode the dilated barcode; and
separately determining a height of the ascender images and the descender images using adjacent bar to bar height differences,
wherein
the locating the top and the bottom of the tracker images comprises laying a grid separating the tracker images at a midpoint between a top half and a bottom half and a plurality of columns dimensioned to substantially separate the tracker images, the ascender images and the descender images,
a difference between a number of pixels for adjacent bars for below and above a midpoint of the tracker images are calculated such that a maximum number of peaks centered within a range of values for the descender images and the ascender images are used to fit a line to the top and bottom of the tracker images.

14. The computer program product of claim 13, wherein the rotating of the extracted object is rotated to 0 degrees so that a midpoint line passes through the midpoint of the tracker images.

15. The computer program product of claim 13, further comprising locally or globally moving sampled points of the extracted image left and/or right to obtain stable sampling data.

16. The computer program product of claim 13, wherein the tracker images between the line to the top and the bottom of the tracker images is removed.

17. The computer program product of claim 16, further comprising flagging bar information of the adjacent bars which corresponding to the maximum number of peaks centered within the range of values for the descender images and the ascender images.

18. The computer program product of claim 13, further comprising removing any non-zero height distortions of the descender images and the ascender images.

19. A system comprising:
a CPU, a computer readable memory and a computer readable storage medium;
program instructions to separate an extracted image of a dilated barcode into a top half and bottom half, the dilated barcode having adjacent bars that touch;
program instructions to locate a top and a bottom of tracker images associated with the dilated barcode by looking for differences in heights between the tracker images and other images above and below the tracker images;
program instructions to globally move the extracted image by pixel by pixel movement to remove any extraneous information and any pixels associated with an adjacent bar of the dilated barcode;
program instructions to remove contributions associated with the tracker images between the other images above and below the tracker images to form a remaining portion barcode;
program instructions to provide the other images above and below the tracker images to a decoder for decoding processes; and
program instructions to separately determine a height of the ascender images and the descender images using adjacent bar to bar height differences,
wherein
the locating the top and the bottom of the tracker images comprises laying a grid separating the tracker images at a midpoint between a top half and a bottom half and a plurality of columns dimensioned to substantially separate the tracker images, the ascender images and the descender images,
a difference between a number of pixels for adjacent bars for below and above a midpoint of the tracker images are calculated such that a maximum number of peaks centered within a range of values for the descender images and the ascender images are used to fit a line to the top and bottom of the tracker images, and
the program instructions are stored on the computer readable storage.

20. The system of claim 19, further comprising program instructions to remove any non-zero height distortions of the other images comprising descender images and ascender images.

* * * * *